US010344167B2

(12) United States Patent
Wilson et al.

(10) Patent No.: US 10,344,167 B2
(45) Date of Patent: Jul. 9, 2019

(54) PARTICLES FOR ELECTROPHORETIC DISPLAYS

(71) Applicants: Merck Patent GmbH, Darmstadt (DE); The Queen's University of Belfast, Belfast (GB)

(72) Inventors: Jonathan Henry Wilson, Darmstadt (DE); Louise Diane Farrand, Dorset (GB); Anthony Lawrence, Manchester (GB); Sarah Youngs, Chilton (GB)

(73) Assignees: Merck Patent GmbH (DE); The Queen's University of Belfast (GB)

( * ) Notice: Subject to any disclaimer, the term of this patent is extended or adjusted under 35 U.S.C. 154(b) by 0 days.

(21) Appl. No.: 15/536,833

(22) PCT Filed: Nov. 25, 2015

(86) PCT No.: PCT/EP2015/002367
§ 371 (c)(1),
(2) Date: Jun. 16, 2017

(87) PCT Pub. No.: WO2016/096085
PCT Pub. Date: Jun. 23, 2016

(65) Prior Publication Data
US 2018/0037742 A1    Feb. 8, 2018

(30) Foreign Application Priority Data
Dec. 19, 2014  (EP) .................................... 14004334

(51) Int. Cl.
| | |
|---|---|
| *G02F 1/167* | (2019.01) |
| *C08F 220/14* | (2006.01) |
| *C09B 69/10* | (2006.01) |
| *C08F 2/06* | (2006.01) |
| *C09B 31/14* | (2006.01) |
| *C09B 35/02* | (2006.01) |
| *C08F 222/24* | (2006.01) |
| *G02F 1/1675* | (2019.01) |

(52) U.S. Cl.
CPC .............. *C09B 69/106* (2013.01); *C08F 2/06* (2013.01); *C08F 222/24* (2013.01); *C09B 31/14* (2013.01); *C09B 35/02* (2013.01); *C09B 69/10* (2013.01); *G02F 1/167* (2013.01); *G02F 2001/1678* (2013.01)

(58) Field of Classification Search
CPC ... C09B 69/106; C09B 31/043; C09B 31/053; C09B 67/22; C09B 1/28; C08F 220/14; C08F 1/167; C08F 220/18; C08F 2/14; C08F 2/26; C08F 222/24; G02F 1/167; G02F 1/17; G02F 2001/1678; C09D 11/50
See application file for complete search history.

(56) References Cited

U.S. PATENT DOCUMENTS

| | | | |
|---|---|---|---|
| 5,326,865 A * | 7/1994 | Grasso .................. | C07C 211/58 534/577 |
| 5,380,362 A | 1/1995 | Schubert | |
| 5,403,518 A | 4/1995 | Schubert | |
| 5,783,614 A | 7/1998 | Chen et al. | |
| 6,194,488 B1 | 2/2001 | Chen et al. | |
| 6,956,690 B2 | 10/2005 | Yu et al. | |
| 7,025,766 B2 | 4/2006 | Whayne et al. | |
| 7,038,655 B2 | 5/2006 | Herb et al. | |
| 7,110,162 B2 | 9/2006 | Wu et al. | |
| 7,170,670 B2 | 1/2007 | Webber | |
| 7,226,550 B2 | 6/2007 | Hou et al. | |
| 7,236,290 B1 | 6/2007 | Zhang et al. | |
| 7,247,379 B2 | 7/2007 | Pullen et al. | |
| 7,277,218 B2 | 10/2007 | Hwang et al. | |
| 7,304,634 B2 | 12/2007 | Albert et al. | |
| 8,268,016 B2 | 9/2012 | Batchelor et al. | |
| 2007/0128352 A1 | 6/2007 | Honeyman et al. | |
| 2007/0268244 A1 | 11/2007 | Chopra et al. | |
| 2012/0090502 A1* | 4/2012 | Chao ...................... | C09B 31/14 106/31.48 |

FOREIGN PATENT DOCUMENTS

| | | | |
|---|---|---|---|
| EP | 0432735 A2 | 6/1991 | |
| EP | 1462485 A1 | 9/2004 | |
| GB | 1261350 A | 1/1972 | |
| GB | 1262092 A | 2/1972 | |
| GB | 1264072 A | 2/1972 | |
| GB | 2438436 A | 11/2007 | |
| WO | WO-199502848 A1 | 1/1995 | |
| WO | WO-9910767 A1 | 3/1999 | |
| WO | WO-2005017046 A2 | 2/2005 | |
| WO | WO-2007053012 A1 | 5/2007 | |
| WO | WO-2010050949 A1 | 5/2010 | |
| WO | WO-2010089057 A2 | 8/2010 | |
| WO | WO-2010104606 A1 | 9/2010 | |
| WO | WO-2011017446 A1 | 2/2011 | |
| WO | WO-2011075720 A1 | 6/2011 | |
| WO | WO-2012019704 A1 | 2/2012 | |
| WO | WO-2012072218 A1 | 6/2012 | |
| WO | WO-2013079146 A1 | 6/2013 | |
| WO | WO 2013170935 A1 * | 11/2013 | ............ C08F 220/14 |
| WO | WO-2014111112 A1 | 7/2014 | |
| WO | WO-2014198375 A1 | 12/2014 | |

OTHER PUBLICATIONS

International Search Report for PCT/EP2015/002367 dated Feb. 2, 2016.
Written Opinion of the International Searching Authority for PCT/EP2015/002367 dated Feb. 2, 2016.

* cited by examiner

*Primary Examiner* — Bijan Ahvazi
(74) *Attorney, Agent, or Firm* — Drinker Biddle & Reath LLP

(57) ABSTRACT

This invention relates to polymer particles, a process for their preparation, the use of these particles for the preparation of an electrophoretic device, electrophoretic displays comprising such particle, and new polymerizable dyes.

21 Claims, No Drawings

PARTICLES FOR ELECTROPHORETIC DISPLAYS

CROSS-REFERENCE TO RELATED APPLICATIONS

This application is a national stage application (under 35 U.S.C. § 371) of PCT/EP2015/002367, filed Nov. 25, 2015, which claims benefit of European Application No. 14004334.0, filed Dec. 19, 2014, both of which are incorporated herein by reference in their entirety.

This invention relates to polymer particles, a process for their preparation, the use of these particles for the preparation of an electrophoretic device, electrophoretic displays comprising such particles, and new polymerisable dyes.

EPDs (Electrophoretic Displays) are low power, low cost and light weight display devices. An EPD generally comprises charged electrophoretic particles dispersed between two substrates, each comprising one or more electrodes. The space between the electrodes is filled with a dispersion medium which is a different colour from the colour of the particles. If a voltage is applied between the electrodes, charged particles move to the electrode of opposite polarity. The particles can cover the observer's side electrode, so that a colour identical to the colour of the particles is displayed when an image is observed from the observer's side. Any image can be observed using a multiplicity of pixels.

An important characteristic of particles intended for use in an electrophoretic fluid is that the particles carry a charge. Only the charge will allow the particles to be moved under an electric filed and hence enable the display pixel to be switched between two optical states. The traditional approach of creating charged species in low dielectric constant media is by the addition of surfactants that form micelles of sufficient size. Alternatively, a charge can be permanently fixed to particles as described in WO 2010/050949 and WO 2012/072218.

One use of EPDs is for electronic paper, i.e. commercially used in electronic books. This application uses black and white colour. The use of different coloured particles in a single pixel has been exemplified in recent patent literature (U.S. Pat. No. 7,304,634, GB 2 438 436, US 2007/0268244). WO 2010/089057, WO 2012/019704, and WO 2013/079146 describe coloured polymer particles comprising polymerised dyes for use in EPDs. Furthermore, special polymerisable dyes are known for use in ophthalmic lens materials from WO 2007/053012 and other polymerisable dyes for colouration of polymeric films are described in WO 95/02848; GB 1262092; GB 1261350; GB 1234072.

There are, however, still drawbacks such as inhibiting problems in copolymerisation of polymerisable dyes, especially dyes containing polar groups and charged or chargeable co-monomers and changes of colour of the polymerisable dyes, especially black to brown.

Therefore, the object of this invention is to provide EPD fluids comprising coloured particles, especially black particles which can be easily dispersed in non-polar media, show electrophoretic mobility, which do not leach dye in a dispersant and do not change colour.

This object is solved by coloured polymer particles for use in electrophoretic devices according to claim 1 comprising monomer units of at least one polymerisable dye of Formula (1), by a process for the preparation of such polymer particles, by the use of these particles for the preparation of an electrophoretic device, by electrophoretic fluids and devices comprising such particles, and by polymerisable dyes of Formula (1). In particular, the present invention concerns black polymer particles, their preparation and use, and corresponding polymerisable dyes.

The present invention advantageously provides a route to prepare coloured polymer particles, especially pMMA polymer particles with a positive charge. Such particles are especially suitable for dual particle fluids, preferably in conjunction with AOT surfactant.

Additionally, the present invention provides a simple preparation of coloured polymer particles, especially black polymer particles, without additional steps. Problems of state of the art processes, like disrupted or inhibited polymerisation process steps and colour change of dyes during polymerisation, especially of black to brown, do not occur with the present process and compounds.

This invention specifically relates to coloured polymeric particles preferably with surface functionality for charge retention. The particles can be easily dispersed in non-polar media, show electrophoretic mobility and they do not leach dye in a dispersant. Therefore, the particles are explicitly useful for electrophoretic fluids and displays.

Essential components of the polymer particles according to the invention are polymerisable dyes of Formula (1)

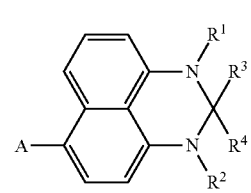

Formula (1)

Wherein

A is a chromophoric residue comprising at least one polymerisable group;

$R^1$ and $R^2$ are independently of each other linear or branched, substituted or unsubstituted alkyl, where one or more non-adjacent carbon atoms may be replaced by O, S and/or N, substituted or unsubstituted cycloalkyl, substituted or unsubstituted aryl;

$R^3$ and $R^4$ are independently of each other H or linear or branched, substituted or unsubstituted alkyl, substituted or unsubstituted cycloalkyl, substituted or unsubstituted aryl, or $R^3$ and $R^4$ forming a cycloaliphatic ring.

Preferably, polymerisable dyes are selected of Formula (2)

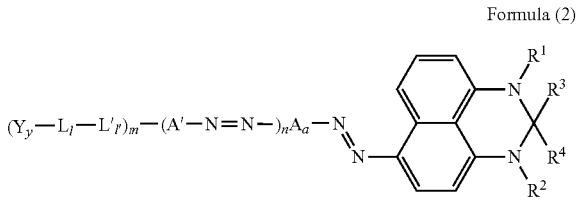

Formula (2)

Wherein

Y is a polymerisable group, L and L' are a linker group, A and A' independently of each other are an aromatic residue, preferably a naphthyl or phenyl ring, y≥1, l and l'=0 or 1, m≥1, n≥0, and a=1.

Especially preferred are polymerisable dyes selected of Formula (3)

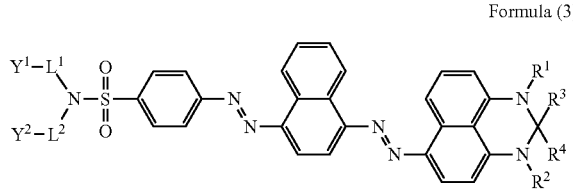

Formula (3)

Wherein

R$^1$ and R$^2$=independently linear or branched, substituted or unsubstituted alkyl, where one or more non-adjacent carbon atoms may be replaced by O, S and/or N, substituted or unsubstituted cycloalkyl, substituted or unsubstituted aryl, R$^3$ and R$^4$=independently H or linear or branched, substituted or unsubstituted alkyl, substituted or unsubstituted cycloalkyl, substituted or unsubstituted aryl, or R$^3$ and R$^4$ forming a cycloaliphatic ring;

L$^1$ and L$^2$ are independently of one another linear or branched, substituted or unsubstituted alkylene groups where one or more non-adjacent carbon atoms may be replaced by O, S and/or N;

Y$^1$ and Y$^2$ are independently of one another linear or branched alkyl groups or polymerisable groups;

and wherein at least one of Y$^1$ and Y$^2$ is a polymerisable group.

Polymerisable dyes where Y$^1$-L$^1$ and Y$^2$-L$^2$ are unsaturated alkyl groups comprising acrylate and methacrylate groups are preferred.

Polymerisable dyes where R$^1$ and R$^2$ are independently of each other aryl or C1-C15 alkyl, especially C2-C12 alkyl are preferred.

Polymerisable dyes where R$^3$ and R$^4$ are independently of each other aryl or C1-C20 alkyl, especially C1-C15 alkyl are preferred.

Especially, black polymerisable dyes according to Formulae (1) to (3) are used.

The polymerisable dye preferably comprises two polymerisable groups selected from e.g. methacrylates, acrylates, methacrylamides, acrylamides, acrylonitriles, α-substituted acrylates, styrenes and vinyl ethers, vinyl esters, propenyl ethers, oxetanes and epoxys etc., in particular methacrylates and acrylates.

Mixtures of polymerisable dyes of Formulae (1) to (3) may also be used. In particular, the dyes listed in Table 1 are used:

TABLE 1

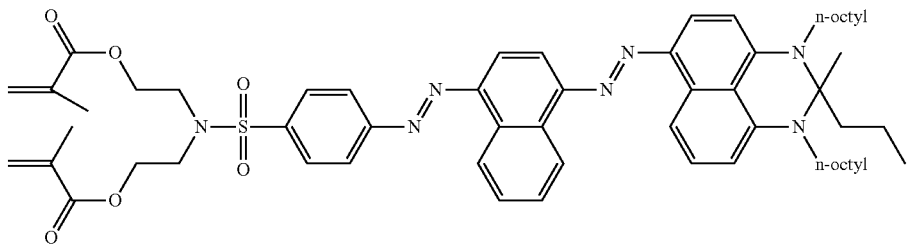

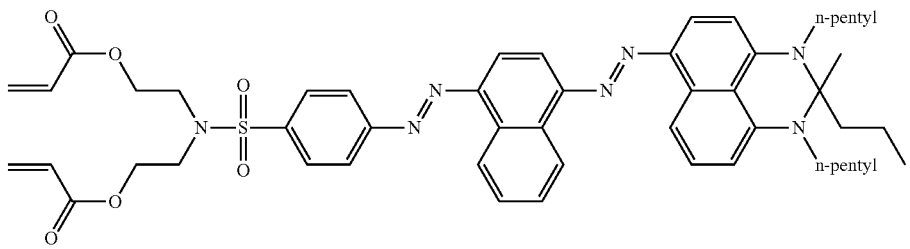

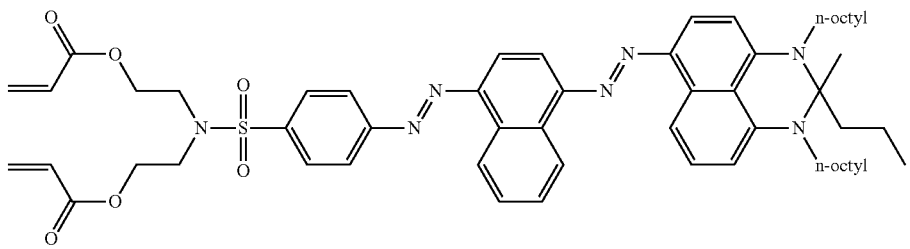

TABLE 1-continued
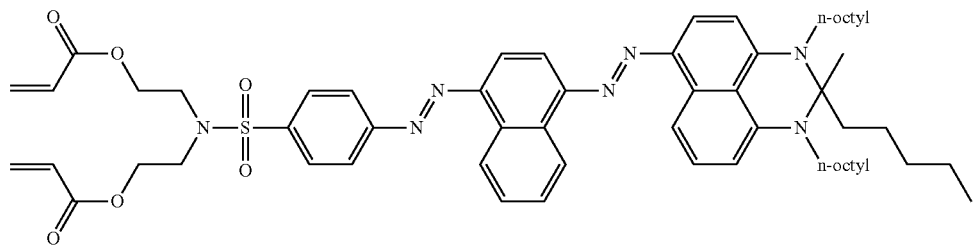
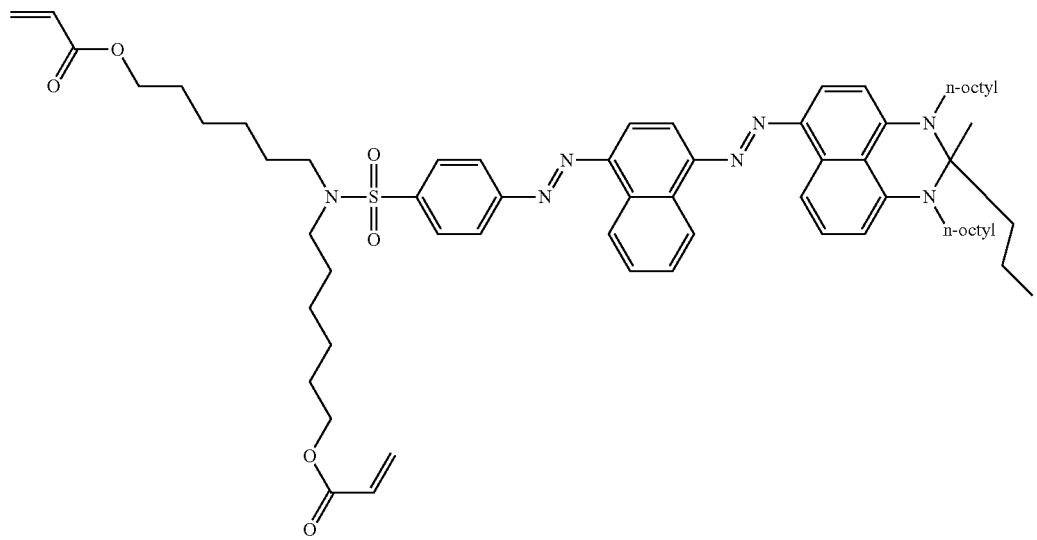
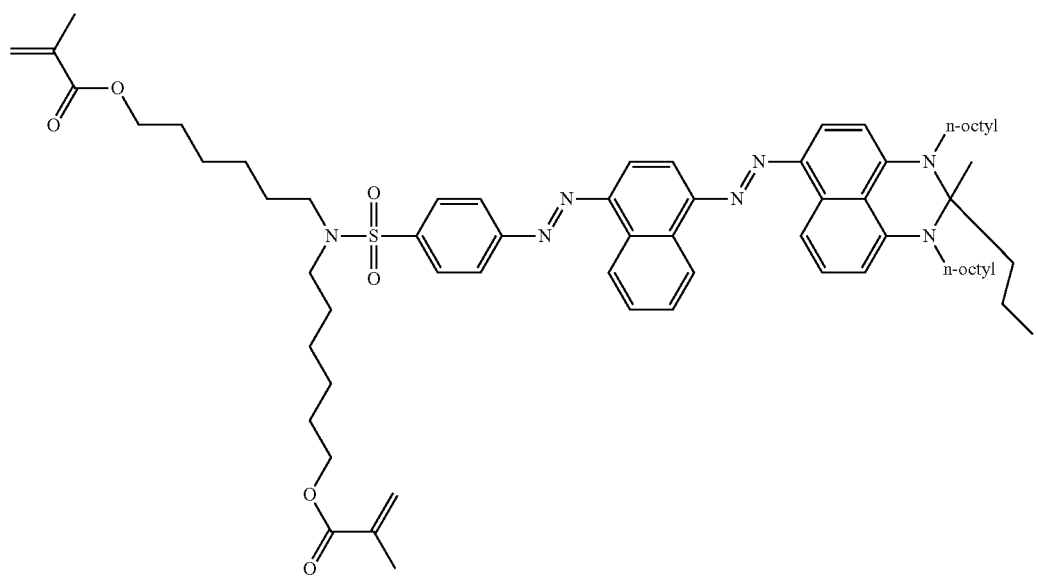
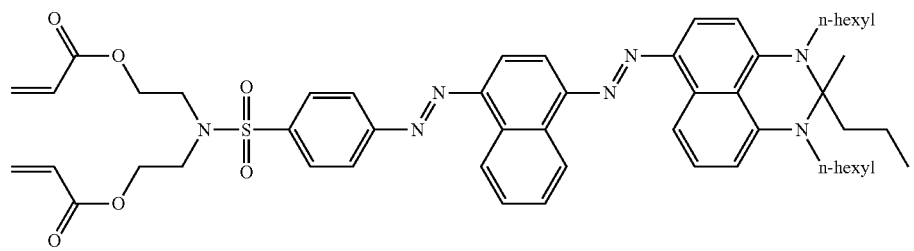

TABLE 1-continued
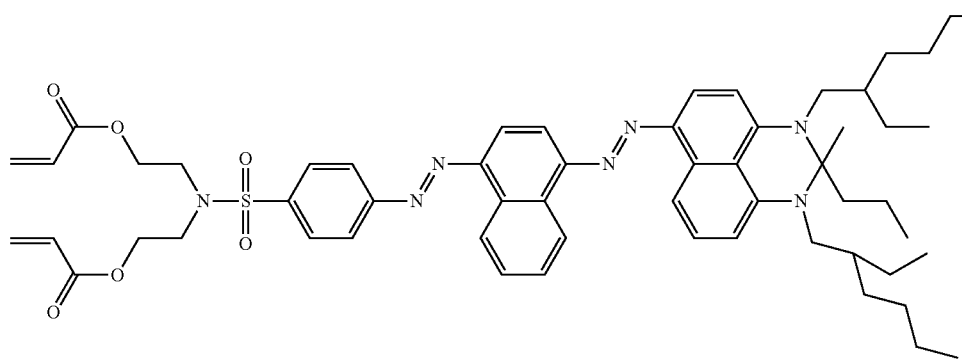
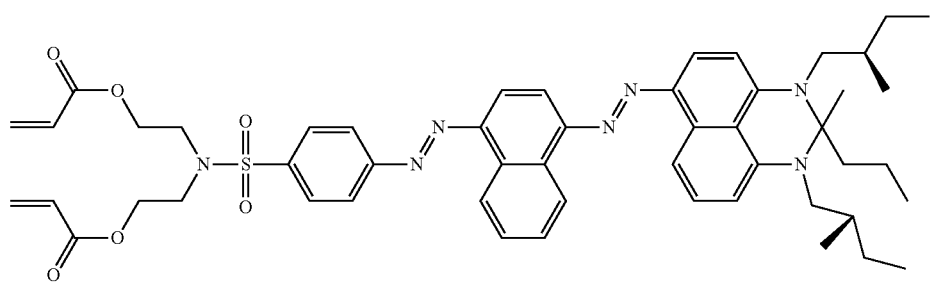 [SMILES: C=CC(=O)OCCN(CCOC(=O)C=C)S(=O)(=O)c1ccc(/N=N/c2ccc(/N=N/c3ccc4c5c(cccc35)N(C[C@@H](C)CC)C(C)(CCC)N4C[C@H](C)CC)c3ccccc23)cc1]
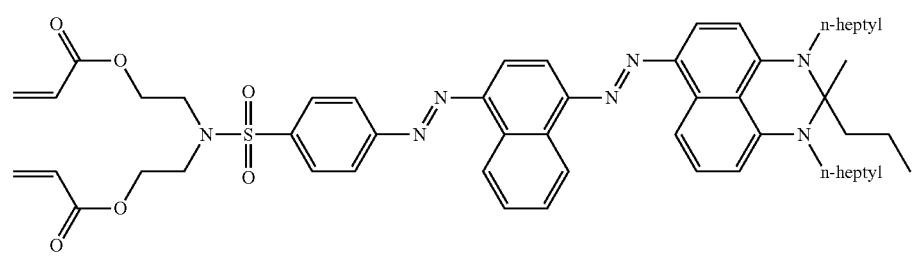
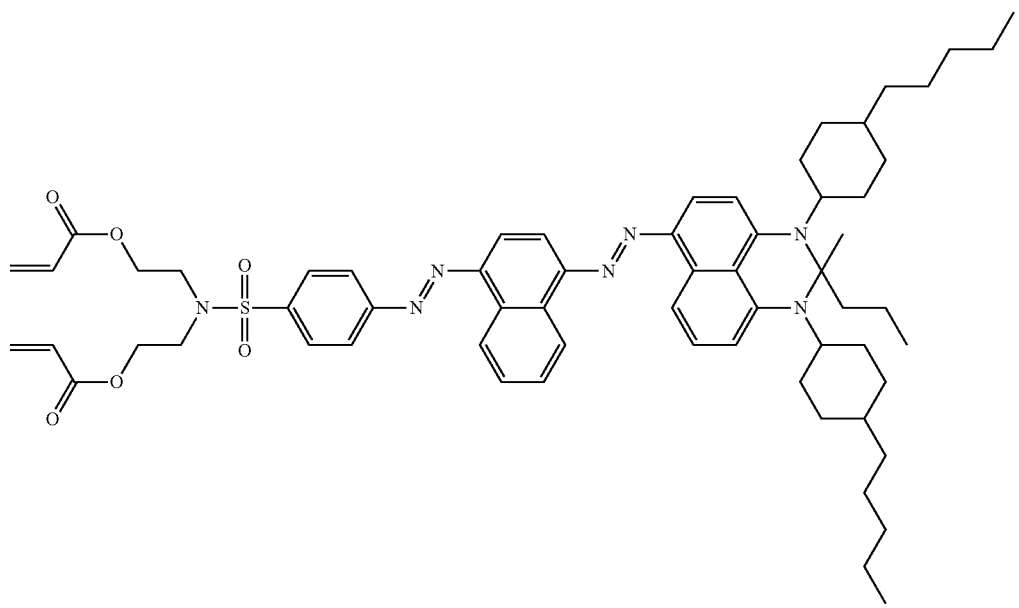 [SMILES: C=CC(=O)OCCN(CCOC(=O)C=C)S(=O)(=O)c1ccc(/N=N/c2ccc(/N=N/c3ccc4c5c(cccc35)N(C3CCC(CCCCC)CC3)C(C)(CCC)N4C3CCC(CCCCC)CC3)c3ccccc23)cc1]

TABLE 1-continued

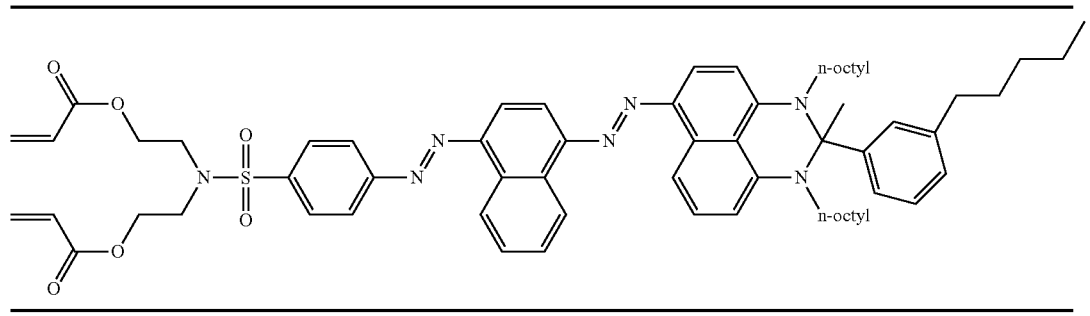

Formula (3a) shows a particularly preferred polymerisable dye (Dye 1):

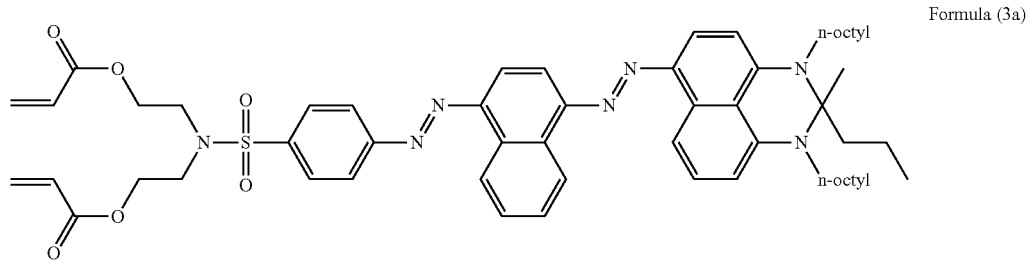

Formula (3a)

The following scheme show by way of example for Dye 1 the synthesis of polymerisable dyes of the invention, especially for dyes of Formulas (3) which can be carried out by processes and under conditions known to the person skilled in the art:

Scheme 1

The preparation of polymerisable dyes of Formulas (2) and (3) by a 6 step procedure under convenient conditions as known in the art is exemplified in the following scheme for 2,2'-(4-(-(4-(-(2-methyl-1,3-dioctyl-2-propyl-2,3-dihydro-1H-perimidin-6-yl)diazenyl)naphthalen-1-yl)diazenyl)phenylsulfonyl-azanediyl)bis(ethane-2,1-diyl)diacrylate:

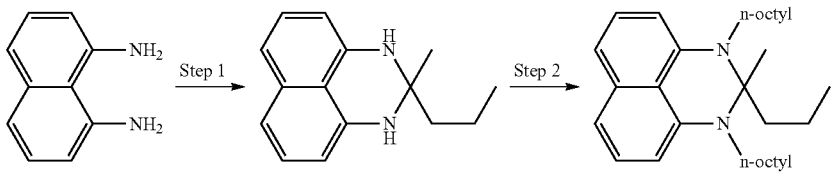

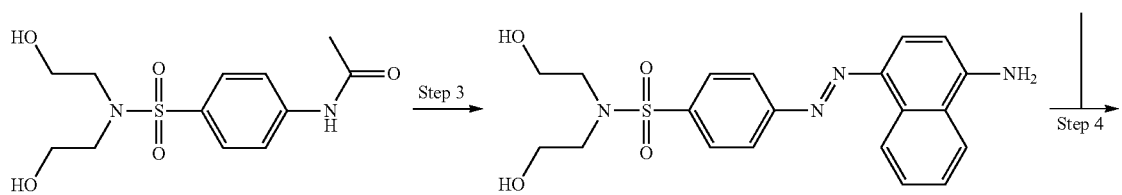

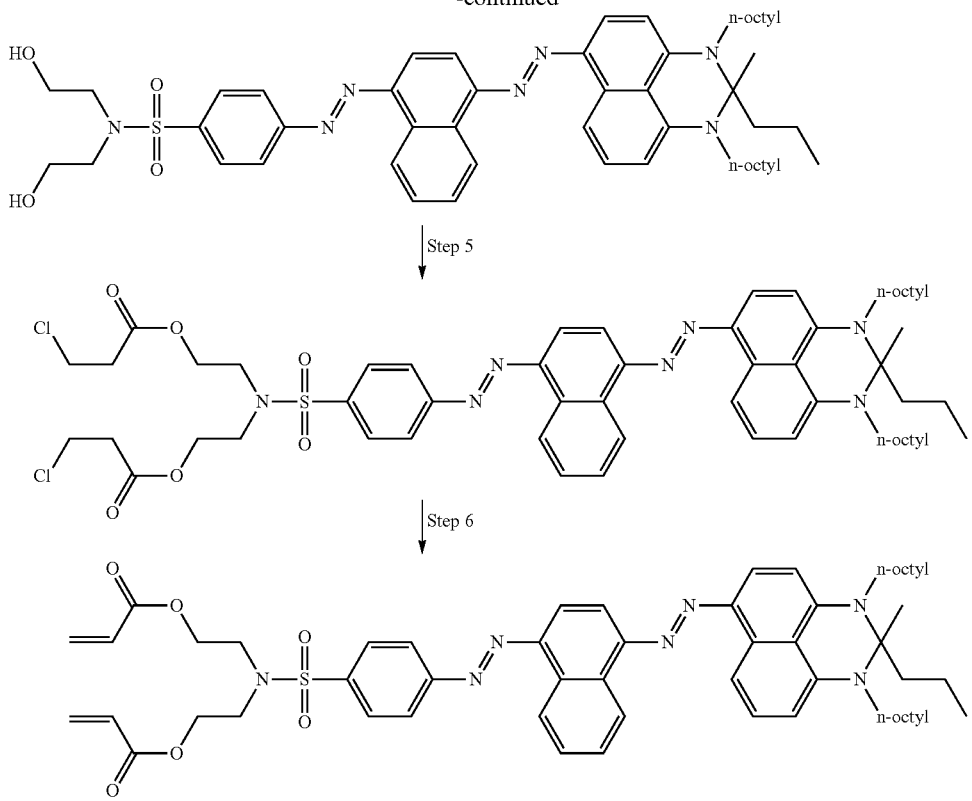

The preparation of further polymerisable dyes according to the invention can be carried out analogously to the illustrative reactions shown above. Further subjects of the invention are polymerisable dyes of Formulas (1) to (3) and the processes of their preparation as disclosed in Scheme 1.

All process steps described above for the preparation of the polymerisable dyes and below for the polymerisation process can be carried out using known techniques and standard equipments which are described in prior art and are well-known to the skilled person.

Preferably black polymerisable dyes of Formula (1) are used to prepare black polymer particles for use in electrophoretic devices. Preferably one black polymerisable dye is used. However, at least two polymerisable dyes of Formula (1) may be used for the preparation of black polymer particles. In a variant of the invention, at least one of the polymerisable dyes of Formula (1) is used in combination with at least one other polymerisable dye, e.g. those described in WO 2010/089057 and in WO 2012/019704. Such combinations may be especially useful for the preparation of polymer particles which are of a neutral black colour.

In a preferred embodiment of the invention, the coloured polymer particles comprise at least one monomer comprising at least one amino group, especially methacrylates, acrylates, acrylamides, and vinyl monomers comprising an amino group.

Coloured polymer particles according to the invention preferably comprise at least one monomer is selected from:

2-Aminoethyl methacrylate hydrochloride, 2-(tert-Butylamino)ethyl methacrylate, Butyl methacrylate, 2-(Diethylamino)ethyl methacrylate, 2-(Dimethylamino)ethyl methacrylate, [2-methacryloxyethyl] trimethyl ammonium chloride (MOTAC), [3-(Methacryloylamino)propyl]trimethylammonium chloride, [2-(Methacryloyloxy)ethyl]trimethylammonium methyl sulfate solution, 4-Acryloylmorpholine, [2-(Acryloyloxy)ethyl]trimethylammonium chloride, 2-[(Butylamino)carbonyl]oxy]ethyl acrylate, tert-Butyl 2-bromoacrylate, 4-tert-Butylcyclohexyl acrylate, 2-(Diethylamino)ethyl acrylate, 3-(Dimethylamino)propyl acrylate, Methyl 2-acetamidoacrylate, N-[3-(Dimethylamino)propyl]methacrylamide, (Vinylbenzyl)trimethylammonium chloride, tetraallyl ammonium chloride, diallyl dimethyl ammonium chloride.

Corresponding fluorinated monomers may also be used.

Further co-monomers incorporated in the coloured polymer particles can be selected from most monomer types, in particular methacrylates, acrylates, acrylamides, methacrylamides, acrylonitriles, α-substituted acrylates, styrenes and vinyl ethers, vinyl esters, propenyl ethers, oxetanes and epoxys.

The following are all examples which could be used and which are commercially available from the Sigma-Aldrich chemical company. Mixtures of monomers may also be used.

Methacrylates:

Methyl methacrylate (MMA), Ethyl methacrylate (EMA), n-Butyl methacrylate (BMA), Allyl methacrylate, Benzyl methacrylate, 2-Butoxyethyl methacrylate Butyl methacrylate, tert-Butyl methacrylate, Caprolactone 2-(methacryloyloxy)ethyl ester, 3-Chloro-2-hydroxypropyl methacrylate, Cyclohexyl methacrylate, Di(ethylene glycol) methyl ether methacrylate2-Ethoxyethyl methacrylate, Ethylene glycol dicyclopentenyl ether methacrylate, Ethylene glycol methyl ether methacrylate, Ethylene glycol phenyl ether methacrylate, 2-Ethylhexyl methacrylate, Furfuryl methacrylate, Glycidyl methacrylate, Glycosyloxyethyl methacrylate, Hexyl methacrylate, Hydroxybutyl methacrylate, 2-Hydroxyethyl methacrylate, 2-Hydroxyethyl methacrylate, Hydroxypropyl methacrylate Mixture of hydroxypropyl and hydroxyisopropyl methacrylates, 2-Hydroxypropyl 2-(methacryloyloxy) ethyl phthalate, Isobornyl methacrylate, Isobutyl methacrylate, 2-Isocyanatoethyl methacrylate, Isodecyl methacrylate, Lauryl methacrylate, Methacryloyl chloride, Methacrylic acid, 2-(Methylthio)ethyl methacrylate, mono-2-(Methacryloyloxy)ethyl maleate, mono-2-(Methacryloyloxy)ethyl succinate, Pentabromophenyl methacrylate, Phenyl methacrylate, Phosphoric acid 2-hydroxyethyl methacrylate ester, Stearyl methacrylate, 3-Sulfopropyl methacrylate potassium salt, Tetrahydrofurfuryl methacrylate, 3-(Trichlorosilyl)propyl methacrylate, Tridecyl methacrylate, 3-(Trimethoxysilyl)propyl methacrylate, 3,3,5-Trimethylcyclohexyl methacrylate, Trimethylsilyl methacrylate, Vinyl methacrylate. Preferably Methyl methacrylate (MMA), Methacrylic acid, Ethyl methacrylate (EMA), and/or n-Butyl methacrylate (BMA) are used.

Acrylates:

Acrylic acid, 2-(4-Benzoyl-3-hydroxyphenoxy)ethyl acrylate, Benzyl 2-propylacrylate, 2-Butoxyethyl acrylate, Butyl acrylate, tert-Butyl acrylate, tert-Butyl 2-bromoacrylate, 4-tert-Butylcyclohexyl acrylate, 2-Carboxyethyl acrylate, 2-Carboxyethyl acrylate oligomers anhydrous, i(ethylene glycol) ethyl ether acrylate technical grade, Di(ethylene glycol) 2-ethylhexyl ether acrylate, acrylate, 2-Ethylacryloyl chloride, Ethyl 2-(bromomethyl)acrylate, Ethyl cis-(β-cyano)acrylate, Ethylene glycol dicyclopentenyl ether acrylate, Ethylene glycol methyl ether acrylate, Ethylene glycol phenyl ether acrylate, Ethyl 2-ethylacrylate, 2-Ethylhexyl acrylate, Ethyl 2-propylacrylate, Ethyl 2-(trimethylsilylmethyl)acrylate, Hexyl acrylate, 4-Hydroxybutyl acrylate, 2-Hydroxyethyl acrylate, 2-Hydroxy-3-phenoxypropyl acrylate, Hydroxypropyl acrylate, Isobornyl acrylate, Isobutyl acrylate, Isodecyl acrylate, Isooctyl acrylate, Lauryl acrylate, Methyl acrylate, Methyl α-bromoacrylate, Methyl 2-(bromomethyl)acrylate, Methyl 3-hydroxy-2-methylenebutyrate, Octadecyl acrylate, Pentabromobenzyl acrylate, Pentabromophenyl acrylate, Poly(ethylene glycol) methyl ether acrylate, Poly(propylene glycol) acrylate, Poly(propylene glycol) methyl ether acrylate Soybean oil, epoxidized acrylate, 3-Sulfopropyl acrylate potassium salt, Tetrahydrofurfuryl acrylate, 3-(Trimethoxysilyl)propyl acrylate, 3,5,5-Trimethylhexyl acrylate. Preferably Methyl acrylate, acrylic acid, Ethyl acrylate (EMA), and/or n-Butyl acrylate (BMA) are used.

Styrenes

Styrene, Divinyl benzene, 4-Acetoxystyrene, 4-Benzyloxy-3-methoxystyrene, 2-Bromostyrene, 3-Bromostyrene, 4-Bromostyrene, α-Bromostyrene, 4-tert-Butoxystyrene, 4-tert-Butylstyrene, 4-Chloro-α-methylstyrene, 2-Chlorostyrene, 3-Chlorostyrene, 4-Chlorostyrene, 2,6-Dichlorostyrene, 2,6-Difluorostyrene, 1,3-Diisopropenylbenzene, 3,4-Dimethoxystyrene, α,2-Dimethylstyrene, 2,4-Dimethylstyrene, 2,5-Dimethylstyrene, 2,4-Diphenyl-4-methyl-1l-pentene, 4-Ethoxystyrene, 2-Fluorostyrene, 3-Fluorostyrene, 4-Fluorostyrene, 2-Isopropenylaniline, 3-Isopropenyl-α,α-dimethylbenzyl isocyanate, Methylstyrene, α-Methylstyrene, 3-Methylstyrene, 4-Methylstyrene, 3-Nitrostyrene, 2,3,4,5,6-Pentafluorostyrene, 2-(Trifluoromethyl)styrene, 3-(Trifluoromethyl)styrene, 4-(Trifluoromethyl)styrene, 2,4,6-Trimethylstyrene. Preferably Styrene and/or Divinyl benzene are used.

Vinyl Groups

9-Vinylanthracene, 3-Vinylbenzoic acid, 4-Vinylbenzoic acid, Vinylbenzyl chloride, 4-Vinylbenzyl chloride, (4-Vinylbiphenyl, 2-Vinyinaphthalene, 2-Vinylnaphthalene, Vinyl acetate, Vinyl benzoate, Vinyl 4-tert-butylbenzoate, Vinyl chloroformate, Vinyl chloroformate, Vinyl cinnamate, Vinyl decanoate, Vinyl neodecanoate, Vinyl neononanoate, Vinyl pivalate, Vinyl propionate, Vinyl stearate, Vinyl trifluoroacetate, Other monomers which may be used are those which have groups to help stabilisation of the particles, e.g. Poly(ethylene glycol) methyl ether acrylate, Poly(ethylene glycol) phenyl ether acrylate, lauryl methacrylate, Poly(ethylene glycol) methyl ether acrylate, Poly(propylene glycol) methyl ether acrylate, Lauryl acrylate and fluorinated monomers of above.

Some of the monomers have groups for further reaction if so desired, e.g. Glycidyl ethacrylate, 2-Hydroxyethyl methacrylate.

The following compounds can be used as intraparticle crosslinking monomers for solubility control and solvent swelling resistance: ethylene glycol dimethacrylate (EGDMA), allyl methacrylate (ALMA), divinyl benzene, Bis[4-(vinyloxy)butyl] adipate, Bis[4-(vinyloxy)butyl] 1,6-hexanediylbiscarbamate, Bis[4-(vinyloxy)butyl] isophthalate, Bis[4-(vinyloxy)butyl] (methylenedi-4,1-phenylene) biscarbamate, Bis[4-(vinyloxy)butyl] succinate, Bis[4-(vinyloxy)butyl]terephthalate, Bis[4-(vinyloxymethyl) cyclohexylmethyl] glutarate, 1,4-Butanediol divinyl ether, 1,4-Butanediol vinyl ether, Butyl vinyl ether, tert-Butyl vinyl ether, 2-Chloroethyl vinyl ether, 1,4-Cyclohexanedimethanol divinyl ether, 1,4-Cyclohexanedimethanol vinyl ether, Di(ethylene glycol) divinyl ether, Di(ethylene glycol) vinyl ether, Ethylene glycol butyl vinyl ether, Ethylene glycol vinyl ether, Tris[4-(vinyloxy)butyl] trimellitate, 3-(Acryloyloxy)-2-hydroxypropyl methacrylate, Bis[2-(methacryloyloxy)ethyl] phosphate, Bisphenol A propoxylate diacrylate, 1,3-Butanediol diacrylate, 1,4-Butanediol diacrylate, 1,3-Butanediol dimethacrylate, 1,4-Butanediol dimethacrylate, N,N'-(1,2-Dihydroxyethylene)bisacrylamide, Di(trimethylolpropane) tetraacrylate, Diurethane dimethacrylate, N,N'-Ethylenebis(acrylamide), Glycerol 1,3-diglycerolate, Glycerol dimethacrylate, 1,6-Hexanediol diacrylate, 1,6-Hexanediol dimethacrylate, 1,6-Hexanediyl-bis[oxy(2-hydroxy-3,1-propanediyl)] bisacrylate, Hydroxypivalyl hydroxypivalate bis[6-(acryloyloxy) hexanoate], Neopentyl glycol diacrylate, Pentaerythritol diacrylate, Pentaerythritol tetraacrylate, Pentaerythritol triacrylate, Poly(propylene glycol) diacrylate, Poly(propylene glycol) dimethacrylate, 1,3,5-Triacryloylhexahydro-1,3,5-triazine, Tricyclo[5.2.1.0]decanedimethanol diacrylate, Trimethylolpropane benzoate diacrylate, Trimethylolpropane ethoxylate methyl ether diacrylate, Trimethylolpropane ethoxylate triacrylate, Trimethylolpropane triacrylate, Trimethylolpropane trimethacrylate, Tris[2-(acryloyloxy)ethyl] isocyanurate, Tri(propylene glycol) diacrylate.

Optionally, the monomer composition comprises at least one charged co-monomer.

The present process for the preparation of polymer particles preferably comprises a) the polymerisation of at least one polymerisable dye of Formula (1), at least one co-monomer, at least one co-monomer with an amino group, at least one initiator, and optionally at least one stabiliser by dispersion polymerisation in at least one non-aqueous, non-polar solvent, and optionally b) washing and drying the polymer particles.

The polymer particles of the invention can preferably be prepared by copolymerisation in a non-aqueous, non-polar solvent, especially by copolymerisation of at least one polymerisable dye of Formula (1), methyl methacrylate (MMA), a co-monomer selected from methacrylates and acrylates with an amino group, stabiliser, and initiator or by emulsion polymerisation, especially by an emulsifier-free batch emulsion polymerisation process. Preferably, dispersion polymerisation in a non-aqueous, non-polar solvent is used.

Preferably, the polymer particles of the invention can be prepared in a simple 1-step reaction in a non-aqueous, preferably non-polar medium. Solvents with a low dielectric constant are preferably used. So, the particles are formed directly in a solvent which is highly suitable as an EPD fluid. This also allows transfer to other solvents suitable for EPD if so desired. The preferred solvents are non-polar hydrocarbon solvents, especially such used in EPD fluids, i.e. the Isopar series (Exxon-Mobil), Norpar, Shell-Sol (Shell), Sol-Trol (Shell), naphtha, and other petroleum solvents, as well as long chain alkanes such as dodecane, tetradecane, hexadecane, decane and nonane. Especially preferred is dodecane. Preferably the polymer particles are simply separated from the reaction suspension by filtration, preferably by pouring the suspension through a pore size filter, i.e. a 5 μm pore size filter, or the particles can be cleaned by centrifuging.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring. Thus, a batch polymerisation process is used for manufacture versus a semi-continuous batch process because of limited versatility and simple evaluations of reaction formulation.

This route avoids the use of aqueous medium as previously reported for the syntheses of coloured polymer particles for EPD. Whereas preparation in aqueous medium has obvious advantages in terms of health, safety and environmental terms, ultimately the coloured polymer particles have to be redispersed in a non-aqueous, non-polar medium for use in EPD. If the particles are prepared in water, then usually a long and power consuming process such as freeze drying or spray drying is required to remove the water. This route avoids such time consuming steps and the coloured polymer particles do not have to be redispersed in to a suitable non-polar solvent for EPD. This route also avoids introducing unwanted traces of water into the EPD dispersion. Therefore, this process provides a one-step reaction to prepare coloured particles suitable for EPD, without the requirement of freeze or spray drying enabling a cost effective production process. No transfer of solvents is required.

Preferably the polymerisation is a free radical polymerisation.

Usually, a monomer composition according to the invention comprises at least one polymerisable dye according to Formula (1), at least one co-monomer, at least one initiator, optionally at least one steric stabiliser, and optionally further co-monomers in a non-aqueous solvent.

The monomers described in the foregoing for preparation of the polymer particles can be combined with the polymerisable dyes to produce a polymerisable dye/monomer mixture and/or the monomers can be incorporated stepwise into the polymerisable mixture to produce special effects, for example a core-shell effect so that there is more dye on the shell of the particles. Particularly preferable are monomers which are similar to the polymerisable dye.

Preferably, an oil soluble initiator is used in the non-aqueous copolymerisation in order to control size, particle morphology and to reduce the residual monomers at the end of the reaction. Preferably an oil-soluble thermal initiator is added in step c) of the present process. Examples are 2,2'-Azobis(4-methoxy-2.4-dimethyl valeronitrile), 2,2'-Azobis(N-butyl2-methylpropionamide), 2,2'-Azobis(2.4-dimethyl valeronitrile), Dimethyl 2,2'-azobis(2-methylpropionate), 2,2'-Azobis(2-methylbutyronitrile), also known as Vazo 67 (DuPont), 1,1'-Azobis(cyclohexane-1-carbonitrile), 2,2'-Azobis[N-(2-propenyl)-2-methylpropionamide], 1-[(1-cyano-1-methylethyl)azo]formamide, 2,2'-Azobis(N-cyclohexyl-2-methylpropionamide) (all available from Wako); Vazo 52 and Vazo 64 (available from DuPont), Luperox 331.

Preferably 2,2'-Azobis(2.4-dimethyl valeronitrile), Dimethyl 2,2'-azobis(2-methylpropionate), 2,2'-Azobis(2-methylbutyronitrile) or Vazo 67 are used.

Preferably the polymerisation according to the invention is a free radical polymerisation. Usually, polymerisation compositions as described above, especially compositions comprising the above-mentioned preferred compounds, are used. A preferred monomer composition comprises methyl methacrylate and dimethylaminoethyl methacrylate in combination with at least one the polymerisable dyes according to Formula (1). Preferably such monomer compositions comprise at least one polymerisable dye of Formulas (2) or (3). Most preferred is Dye 1.

The polymerisable composition of the invention usually comprises 0.1-15, preferably 1-10%, by weight of at least one polymerisable dye according to Formula (1), 50-95%, preferably 70-90%, by weight of monomer, 1-40%, preferably 1-10%, by weight of monomer comprising amino groups, and 0.1-10%, preferably 0.1-5%, by weight of initiator, all percentages are based on the total weight of the polymerizable composition (except solvent). Combinations of polymerisable dyes according to Formula (1) with other polymerisable dyes may also be used in such compositions.

To enhance the surface stabilisation or steric repulsions of the polymeric particles in a non-polar continuous phase, a steric stabiliser is preferably incorporated into the coloured polymer particles. Preferably a non-aqueous dispersion (NAD) stabiliser is adsorbed on to the particle.

Suitable NAD stabilisers are block copolymers with a comb shape structure. Especially block copolymers with a molecular weight of approximately 10,000-100,000 can be used. The molecular weight ratio of the backbone to hairs may be approximately 1:1. The particle dispersion medium (non-polar solvent) preferably is a poor solvent for the backbone. The backbone chemistry preferably is similar to the particle. The length of the hairs preferably is of the order of the distance required to sterically stabilise the particles. The particle dispersion medium preferably is a good solvent for the hairs. It is possible to attach chromophores and/or charging groups to the backbone and or the hairs. NAD stabilisers are commercially available or can be prepared to known methods, e.g. as described in 'Dispersion Polymerization in Organic Media', ISBN 0471 054186, edited by K. E. J. Barrett, published by John Wiley and Sons, Copyright 1975, by Imperial Chemical Industries Ltd. Preferred NAD stabilisers are for example poly(hydroxystearic acid), and poly(hydroxystearic acid) graft (poly) methyl methacrylate and methacrylic acid copolymers, Solsperse 3000, Solsperse 11,200, Solsperse 13,300 and Solsperse 13,240 from Lubrizol Ltd., UK. Advantageously stabilisers comprising additionally copolymerised glycidyl methacrylate may be permanently locked in the polymer particle. This is simply done in the same vessel, by raising the temperature and adding diethanolamine. This opens up a glycidyl ring which is then available to polymerise with unreacted carboxylic acid groups from a methacrylic acid monomer.

In an especially preferred embodiment of the invention a polymerisable steric stabiliser is used. The polymerisable steric stabilisers need to be soluble in non-polar solvents, particularly dodecane, and have some reactive functionality such that they take part in the polymerisation. This creates a particle with a covalently bound surface of sterically stabilising compounds providing stability during and after polymerisation. The polymerisable steric stabiliser can be used in a range of molecular weights which allows strict control over the steric barrier surrounding the particles to prevent aggregation. The polymerisable group incorporates irreversibly into the particles and is therefore anchored to the surface.

A typical polymerisable steric stabiliser of the invention is a poly(dimethylsiloxane) macro-monomer (PDMS). The poly(dimethylsiloxane) may comprise one or two polymerisable groups, preferably one polymerisable group.

The following stabiliser types could be used and are commercially available from Gelest Inc.:

Methacryloyloxypropyl terminated polydimethylsiloxanes (mws 380, 900, 4500, 10000, 25000) Methacryloyloxypropyl terminated polydimethylsiloxanes (mw 600), Methacryloyloxypropyl terminated polydimethylsiloxanes (1500, 1700), (3-acryloxy-2-hydroxypropoxypropyl) terminated PDMS (mw 600), Acryloxy terminated ethyleneoxide-dimethylsiloxane-ethyleneoxide ABA block copolymers (mw 1500, 1700), methacyloyloxpropyl terminated branched polydimethylsiloxanes (683), (methacryloxypropyl)methylsiloxanes-Dimethylsiloxane copolymers (viscosity 8000, 1000, 2000), (acryloxypropyl)methylsiloxane-dimethylsiloxanes copolymers (viscosity 80, 50), (3-acryloxy-2-hydroxypropoxypropyl)methylsiloxane-dimethylsiloxane copolymers (mw 7500), mono(2,3-epoxy)propyl ether terminated polydimethylsilxoanes (mw 1000, 5000), monomethacryloxypropyl terminated polydimethylsiloxanes asymmetric (mw 600, 800, 5000, 10000), monomethacryloxypropyl functional polydimethylsiloxanes—symmetric (mw 800), monomethacryloxypropyl terminated polytrifluoropropylmethylsiloxanes-symmetric (mw 800) monovinyl terminated polydimethylsiloxanes (mw 5500, 55000, monovinyl functional polydimethylsiloxanes—symmetric (mw 1200).

Preferred polymerisable groups are methacrylate, acrylate, and vinyl groups, preferably methacrylate and acrylate groups. Most preferred are poly(dimethylsiloxane) methacrylates (PDMS-MA), especially methacryloyloxypropyl terminated PDMS-MAs as shown in Formulas 1 and 2, wherein n=5-10000. Most preferred are poly(dimethylsiloxanes) with one methacrylate group.

Formula 1

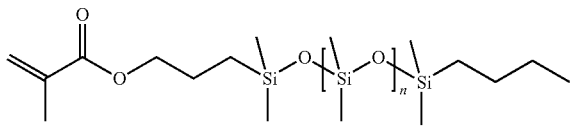

Formula 2

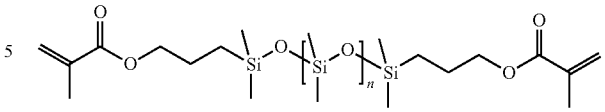

The polymerisable steric stabiliser of the invention preferably has a molecular weight in the range of 1000-50000, preferably 3500-35000, more preferably 5000-25000. Most preferred are methacrylate terminated polydimethylsiloxanes with a molecular weight of 10,000 or more, especially 10000-25000.

Advantageously, the polymerisable compositions of the invention comprise a combination of the above-mentioned preferred compounds polymerisable dye, co-monomer, and polymerisable steric stabiliser. Most preferred are combinations of polymerisable dyes according to Formula (3), methyl methacrylate, polymerisable co-monomers comprising an amino group, and methacrylate terminated polydimethylsiloxanes with a molecular weight of 10,000 or more.

Optionally, the polymerisable compositions of the invention comprise a chain transfer agent, e.g. catalytic chain transfer reagents, alkyl and aryl thiols, alcohols and carboxylic acids, halogenated organics and selected inorganic salts. Examples of suitable chain transfer agents are 2-propanol, adipic acid, thioglycolic acid, 2-mercaptoethanol, sodium hypochlorite, carbon tetrachloride and heavy metal poryphyrins, particularly cobalt poryphyrins preferably octane thiol.

The polymerisable composition of the invention usually comprises 0.1-15%, preferably 2.5-13%, by weight of at least one polymerisable dye, 0.1-15%, preferably 2.5-13%, by weight of at least one co-monomer comprising amino groups, 0.1-50%, preferably 20-40%, by weight of at least one polymerisable steric stabiliser, 50-95%, preferably 60-90%, by weight of monomer, optionally 0-3%, by weight of chain transfer agent, and 0.1-10%, preferably 0.1-5%, by weight of initiator, all percentages are based on the total weight of the polymerisable composition (except solvent) and always add to 100 percent even if ranges of percentages could lead to higher values.

Advantageously, the polymerisable composition of the invention comprises in a non-polar hydrocarbon solvent, especially dodecane, 0.1-13%, by weight of at least one of the above-mentioned preferred co-monomers comprising amino groups, 1-40%, by weight of at least one of the above-mentioned preferred polymerisable steric stabiliser, 0.1-13%, by weight of at least one of the above-mentioned preferred polymerisable dyes, 5-50%, by weight of at least one of the above-mentioned preferred monomers, 0.1-5% by weight of initiator, and optionally 0-3%, by weight of chain transfer agent.

Polymer particles prepared according to the invention are preferably spherical particles with a size (diameter) in the range of 50-1200 nm, preferably 400-1000 nm, especially 400-700 nm, and preferably with a monodisperse size distribution. Smaller or larger particles can be further separated if required by centrifugation. Particle sizes are determined by photon correlation spectroscopy of hydrocarbon particle dispersions by a common apparatus such as a Malvern NanoZS particle analyser or preferably by SEM (Scanning Electron Microscopy) and image analysis.

A further subject of the invention is a process for the preparation of polymer particles. The polymer particles of the invention are preferably prepared using a dispersion polymerisation. This is a convenient single step method of preparing low polydispersity coloured particles. It is performed in a fluid which is a good solvent for the monomer and a non-solvent for the synthesised polymer particles. This solvent can also be used as the same solvent for EPD, e.g. dodecane. The preferred solvents are non-polar hydrocarbon solvents, especially such used in EPD fluids, i.e. the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane. Especially preferred is dodecane. The concentration of the particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the coloured polymer particles are simply separated from the reaction suspension by filtration, preferably by pouring the suspension through a pore size filter, i.e. a 0.1 μm pore size filter, or the particles can be cleaned by centrifuging.

The selection of the polymerisation conditions depends on the required size and size distribution of the particles. Adjustment of polymerisation conditions is well known to someone skilled in the art.

Preferably, a batch polymerisation process is used wherein all reactants are completely added at the outset of the polymerisation process. In such process only relatively few variables have to be adjusted for a given formulation. Preferred changes which can be made in such cases are to the reaction temperature, reactor design and the type and speed of stirring. Thus, a batch polymerisation process is used for manufacture versus a semi-continuous batch process because of limited versatility and simple evaluations of reaction formulation.

A further advantage of the process according to the invention is that it is surfactant-free. Protective colloids (soluble polymers) and surfactants are usually key formulation variables in heterogeneous polymerisations because of their impact on the intraparticle stability and particle size control but they may have a detrimental effect on the electrophoretic response.

Preferably the polymerisation according to the invention is a free radical polymerisation. Initiators can be for example 2,2'-azobis(isobutyronitrile) (AIBN) (Wako Chemicals), 2,2'-azobis(2-methylbutyronitrile) (Vazo 67) (Wako Chemicals) and benzoyl peroxide.

Typical process conditions are described for the preparation of coloured pMMA particles incorporating polymerisable dyes. Methyl methacrylate, polymerisable dye, co-monomer comprising an amino group, and a PDMS-methacrylate are added to a non-polar hydrocarbon solvent, preferably dodecane. The reaction mixture is stirred under nitrogen at 300 rpm, then heated to 60-90, preferably 75° C. An initiator, preferably Vazo 59 or azobisisobutyronitrile is added to initiate polymerisation. The reaction is allowed to proceed for approximately 2 hours after which time the reaction is allowed to cool to room temperature. The particles are filtered through a 50 micron cloth and are cleaned by centrifugation and redispersion in dodecane if required.

The concentration of the final particles in the non-polar solvent can be increased if desired by centrifugation, i.e. forced settling of the particles and pouring off excess solvent, or a stirred cell filtration system can be used. The dispersion can be washed with a non-polar solvent if required. If necessary, the particles are simply separated from the reaction suspension by filtration, preferably by pouring the suspension through a pore size filter, i.e. a 0.1 μm pore size filter, or the particles can be cleaned by centrifuging.

Particles and dispersions of the invention are primarily designed for use in electrophoretic applications, especially for use in mono, bi or polychromal electrophoretic devices. A typical electrophoretic display comprises an electrophoretic fluid comprising the particles dispersed in a low polar or non-polar solvent along with additives to improve electrophoretic properties, such as stability and charge. Examples of such electrophoretic fluids are well described in the literature, for example U.S. Pat. No. 7,247,379; WO 99/10767; US 2007/0128352; U.S. Pat. Nos. 7,236,290; 7,170,670; 7,038,655; 7,277,218; 7,226,550; 7,110,162; 6,956,690; 7,052,766; 6,194,488; 5,783,614; 5,403,518; 5,380,362.

The particles of the invention may be used in combination with a dyed fluid, with additional particles such as oppositely or equally charged particles of different colour.

Typical additives to improve the stability of the fluid (either by steric stabilisation or by use as a charging agent) are known to experts in the field and include (but are not limited to) the Brij, Span and Tween series of surfactants (Aldrich), Infineum surfactants (Infineum), the Solsperse, Ircosperse and Colorburst series (Lubrizol), the OLOA charging agents (Chevron Chemicals) and Aerosol-OT (Aldrich). Typical surfactants used in this process are cationic, anionic, zwitterionic or non-ionic with a hydrophilic portion usually termed the head group which is mono-, di- or polysubstituted with a hydrophobic portion usually termed the tail. The hydrophilic head group of the surfactant in this process can be, but is not limited to being, made up of derivatives of sulfonates, sulfates, carboxylates, phosphates, ammoniums, quaternary ammoniums, betaines, sulfobetaines, imides, anhydrides, polyoxyethylene (e. g. PEO/PEG/PPG), polyols (e. g. sucrose, sorbitan, glycerol etc), polypeptides and polyglycidyls. The hydrophobic tail of the surfactant in this process can be, but is not limited to being, made up of straight and branched chain alkyls, olefins and polyolefins, rosin derivatives, PPO, hydroxyl and polyhydroxystearic acid type chains, perfluoroalkyls, aryls and mixed alkyl-aryls, silicones, lignin derivatives, and partially unsaturated versions of those mentioned above. Surfactants for this process can also be catanionic, bolaforms, gemini, polymeric and polymerisable type surfactants.

Any other additives to improve the electrophoretic properties can be incorporated provided they are soluble in the formulation medium, in particular thickening agents or polymer additives designed to minimise settling effects.

In case another dispersion solvent shall be used in addition or separately for particles of the invention, it can be chosen primarily on the basis of dielectric constant, refractive index, density and viscosity. A preferred solvent choice would display a low dielectric constant (<10, more preferably <5), high volume resistivity (about $10^{15}$ ohm-cm), a low viscosity (less than 5 cst), low water solubility, a high boiling point (>80° C.) and a refractive index and density similar to that of the particles. Adjustment of these variables can be useful in order to change the behaviour of the final application. For example, in a slow-switching application such as poster displays or shelf labels, it can be advantageous to have an increased viscosity to improve the lifetime of the image, at the cost of slower switching speeds. However in an application requiring fast switching, for example e-books and displays, a lower viscosity will enable faster switching, at the cost of the lifetime in which the image remains stable (and hence an increase in power consumption as the display will need more frequent addressing). The preferred solvents are often non-polar hydrocarbon solvents such as the Isopar series (Exxon-Mobil), Norpar, Shell-Sol (Shell), Sol-Trol (Shell), naphtha, and other petroleum solvents, as well as long chain alkanes such as dodecane, tetradecane, decane and nonane). These tend to be low dielectric, low viscosity, and low density solvents. A density matched particle/solvent mixture will yield much improved settling/sedimentation characteristics and thus is desirable. For this reason, often it can be useful to add a halogenated solvent to enable density matching. Typical examples of such solvents are the Halocarbon oil series (Halocarbon products), or tetrachloroethylene, carbon tetrachloride, 1,2,4-trichlorobenzene and similar solvents. The negative aspect of many of these solvents is toxicity and environmental friendliness, and so in some cases it can also be beneficial to add additives to enhance stability to sedimentation rather than using such solvents.

The preferred additives and solvents used in the formulation of the particles of the invention are Aerosol OT (Aldrich), Span 85 (Aldrich), MCR-C22 (Gelest), and dodecane (Sigma Aldrich). Especially, MCR-C22 (Gelest) and dodecane (Sigma Aldrich) can be used.

The solvents and additives used to disperse the particles are not limited to those used within the examples of this invention and many other solvents and/or dispersants can also be used to disperse particles made according to the invention. Lists of suitable solvents and dispersants for electrophoretic displays can be found in existing literature, in particular WO 99/10767 and WO 2005/017046. The electrophoretic fluid is then incorporated into an electrophoretic display element by a variety of pixel architectures, such as can be found in C. M. Lampert, Displays; 2004, 25(5) published by Elsevier B.V., Amsterdam.

The electrophoretic fluid may be applied by several techniques such as inkjet printing, slot die spraying, nozzle spraying, and flexographic printing, or any other contact or contactless printing or deposition technique.

Electrophoretic displays comprise typically, the electrophoretic display media in close combination with a monolithic or patterned backplane electrode structure, suitable for switching the pixels or patterned elements between the black and white optical states or their intermediate greyscale states.

The dispersions and the coloured and black particles according to the present invention are suitable for all known electrophoretic media and electrophoretic displays, e.g. flexible displays, TIR-EPD (total internal reflection electrophoretic devices), one particle systems, two particle systems, dyed fluids, systems comprising microcapsules, microcup systems, air gap systems and others as described in C. M. Lampert, Displays; 2004, 25(5) published by Elsevier B.V., Amsterdam. Examples of flexible displays are dynamic keypads, e-paper watches, dynamic pricing and advertising, e-readers, rollable displays, smart card media, product packaging, mobile phones, lab tops, display card, digital signage, shelf edge labels, etc.

Particles and dispersions of the invention may also be used in optical, electrooptical, electronic, electrochemical, electrophotographic, electrowetting, electro-osmosis, and electrohydrodynamic displays and/or devices, e.g. TIR (total internal reflection electronic devices), and in security, cosmetic, decorative, signage, and diagnostic applications. The use in electrowetting displays is preferred. Electrowetting (EW) is a physical process where the wetting properties of a liquid droplet are modified by the presence of an electric field. This effect can be used to manipulate the position of a coloured fluid within a pixel. For example, a nonpolar (hydrophobic) solvent containing colourant can be mixed with a clear colourless polar solvent (hydrophilic), and when the resultant biphasic mixture is placed on a suitable electrowetting surface, for example a highly hydrophobic dielectric layer, an optical effect can be achieved. When the sample is at rest, the coloured non-polar phase will wet the hydrophobic surface, and spread across the pixel. To the observer, the pixel would appear coloured. When a voltage is applied, the hydrophobicity of the surface alters, and the surface interactions between the polar phase and the dielectric layer are no longer unfavourable. The polar phase wets the surface, and the coloured non-polar phase is thus driven to a contracted state, for example in one corner of the pixel. To the observer, the pixel would now appear transparent. A typical electrowetting display device consists of the particles in a low polar or non-polar solvent along with additives to improve properties, such as stability and charge. Examples of such electrowetting fluids are described in the literature, for example in WO2011/017446, WO 2010/104606, and WO 2011/075720.

The disclosures in the cited references are expressly also part of the disclosure content of the present patent application. In the claims and the description, the words "comprise/ comprises/comprising" and "contain/contains/containing" mean that the listed components are included but that other components are not excluded. The following examples explain the present invention in greater detail without restricting the scope of protection. In the foregoing and in the following examples, unless otherwise indicated all parts and percentages are by weight.

EXAMPLES

All materials and solvents used are sourced from Sigma-Aldrich and used without further purification unless otherwise stated. Polydimethylsiloxane-methacrylate (PDMS-MA) with a molecular weight of 10,000 is obtained from Fluorochem. V-59 is obtained from VWR. Sizing of particles on SEM is done using ImageJ which is a public domain, Java-based image processing program.

Example 1

Preparation of Black Dye

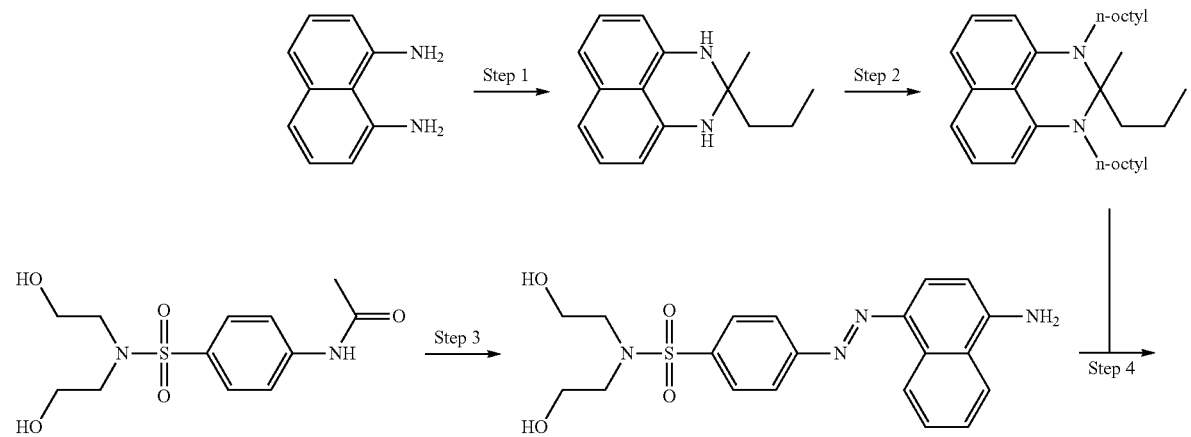

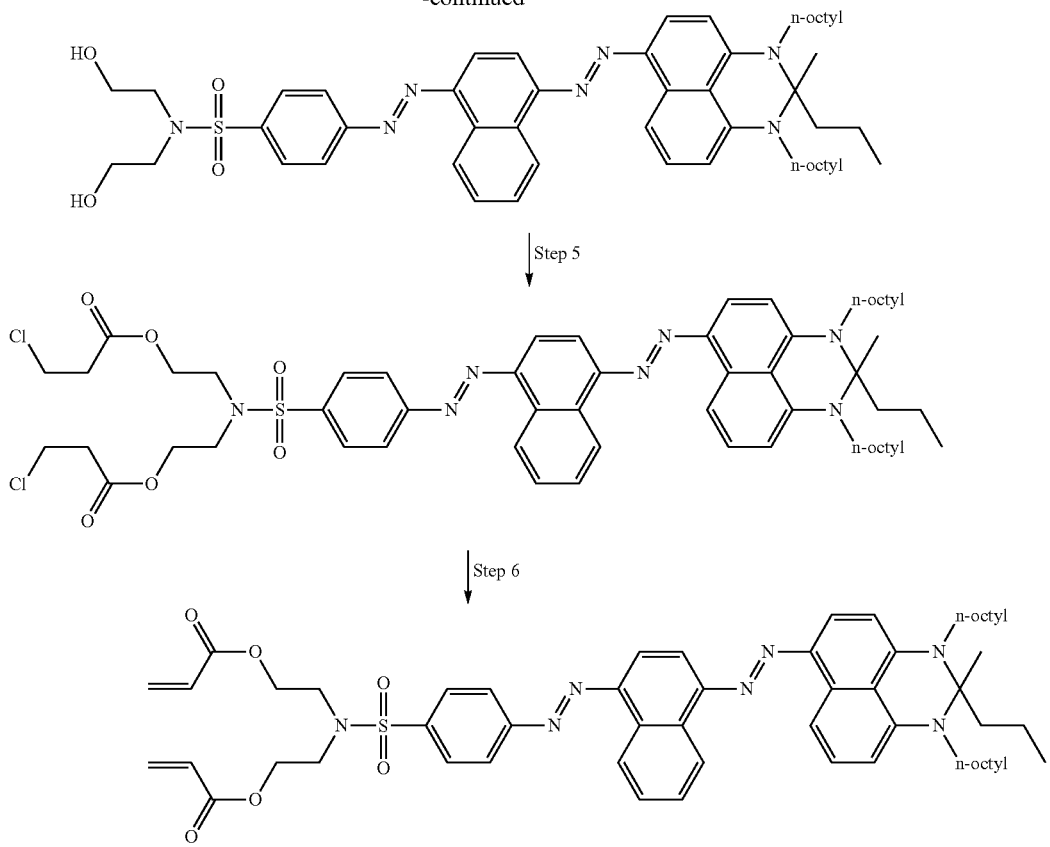

| Step 5

| Step 6

Step 1: 2-Methyl-2-propyl-2,3-dihydro-1H-perimidine 1,8-Diaminonaphthalene (31.6 g, 0.20 mol) is dissolved in 2-pentanone (344.5 g, 4.0 mol) and 35% HCl (2 ml) added and is heated to 50° C. After 1 h at this temp., the solution is allowed to cool then washed with saturated NaHCO₃ solution. Evaporation of excess 2-pentanone in vacuo affords a brown oil. The oily solid is triturated with hexane and the resultant solid is filtered off. After drying at 40° C., the title compound is obtained as a beige solid (37.8 g, 83%).

Step 2: 2-Methyl-1,3-dioctyl-2-propyl-2,3-dihydro-1H-perimidine

A stirred mixture of 2-methyl-2-propyl-2,3-dihydro-1H-perimidine (11.3 g, 0.05 mol), 1-bromooctane (24.1 g, 0.125 mol), 1-methyl-2-pyrrolidone and sodium hydrogen carbonate (21.0 g, 0.250 mol) is heated for 24 h at 100° C. then allowed to cool to room temp. The mixture is poured into water and extracted with hexane. The organic extracts are combined, dried (Na₂SO₄) and evaporated in vacuo to afford a brown oil. The crude oil is purified by flash column chromatography eluted with an increasing gradient of dichloromethane (0-10%) in hexane. Appropriate fractions are combined and evaporated to give the title compound as a straw coloured oil (10.1 g, 45%).

Step 3: 4-((4-Aminonaphthalen-1-yl)diazenyl)-N,N-bis(2-hydroxyethyl)benzenesulfonamide N-(4-(N,N-Bis(2-hydroxyethyl)sulfamoyl)phenyl)acetamide (12.0 g, 39.7 mmol) is suspended in water (120 ml) and sodium hydroxide (9.5 g, 238 mmol) is added. The solution is heated for 1 h at 90° C. then allowed to cool to room temp. The solution is cooled further in an ice bath to 3° C. and 35% HCl (ca 40 ml) added dropwise at <10° C., until pH 1. A solution of sodium nitrite (3.0 g, 43.7 mmol) in water (20 ml) is then added at <5° C. 1-Napthylamine (5.7 g, 39.7 mmol) is charged to a separate vessel and suspended in water (100 ml). 5M HCl (10 ml, 50 mmol) is added and the mixture heated to 80° C. to dissolve all solid. The 1-napthylamine solution is then allowed to cool to room temp. producing a fine solid suspension. This suspension is added to the above diazonium salt solution concurrently with a solution of sodium acetate trihydrate (26 g, 190 mmol) in water (100 ml). After stirring overnight, the solid is filtered off then re-suspended in water (500 ml). The solid is collected again by filtration, then re-slurried in 2-propanol (300 ml). After stirring for 30 minutes, the solid is filtered off and dried, to give the title compound as a brown solid (11.8 g, 72%).

Step 4: N,N-Bis(2-hydroxyethyl)-4-(-(4-(-(2-methyl-1,3-dioctyl-2-propyl-2,3-dihydro-1H-perimidin-6-yl)naphthalen-1-yl)diazenyl)benzenesulfonamide 4-((4-Aminonaphthalen-1-yl)diazenyl)-N, N-bis(2-hydroxyethyl)benzenesulfonamide (7.8 g, 18.9 mmol) is dissolved in 1-methyl-2-pyrrolidone (30 ml) and cooled in an ice bath to 3° C. 40% (w/w) Nitrosyl sulfuric acid (7.2 g, 22.6 mmol) is added dropwise at <5° C. This diazonium salt solution is then added to a solution of 2-methyl-1,3-dioctyl-2-propyl-2,3-dihydro-1H-perimidine (8.5 g, 18.9 mmol) in THF (100 ml) containing 10% sulfamic acid solution (20 ml). Ice/water (100 g) is added and the reaction mixture is stirred overnight. The supernatant is decanted off to leave a black gum. The residue is dissolved in dichloromethane, dried (MgSO$_4$) and evaporated in vacuo. The residue is purified over silica gel eluting with dichloromethane. Pure product fractions are combined and evaporated in vacuo to afford the pure title compound as a black foam (6.4 g, 39%).

Step 5: 2,2'-(4-(-(4-(-(2-methyl-1,3-dioctyl-2-propyl-2,3-dihydro-1H-perimidin-6-yl)diazenyl)naphthalen-1-yl)diazenyl)phenylsulfonylazanediyl)bis(ethane-2,1-diyl)bis(3-chloropropanoate)

N,N-Bis(2-hydroxyethyl)-4-(-(4-(-(2-methyl-1,3-dioctyl-2-propyl-2,3-dihydro-1H-perimidin-6-yl)diazenyl)naphthalen-1-yl)diazenyl)benzenesulfonamide (2.0 g, 2.3 mmol) is dissolved in dichloromethane (40 ml). Sodium bicarbonate (1.9 g, 23 mmol) is added, followed by 3-chloropropionyl chloride (0.9 g, 69 mmol). The mixture is heated at 35° C. for 16 h then a further portion of 3-chloropropionyl chloride (0.3 g, 23 mmol) is added. After a further 24 h at 35° C., the reaction is allowed to cool, filtered, and the filtrate concentrated in vacuo to a black gum. The crude material is purified over silica gel eluting with dichloromethane. Pure product fractions are combined and evaporated in vacuo to afford the pure title compound as a black tar (1.0 g, 41%), which is judged to be 97% pure by HPLC with 600 nm detection.

Step 6: 2,2'-(4-(-(4-(-(2-methyl-1,3-dioctyl-2-propyl-2,3-dihydro-1H-perimidin-6-yl)diazenyl)naphthalen-1-yl)diazenyl)phenylsulfonylazanediyl)-bis(ethane-2,1-diyl)diacrylate 2,2'-(4-(-(4-(-(2-Methyl-1,3-dioctyl-2-propyl-2,3-dihydro-1H-perimidin-6-yl)diazenyl)naphthalen-1-yl)diazenyl)phenylsulfonylazanediyl)bis(ethane-2,1-diyl)bis(3-chloropropanoate) (1.0 g, 1 mmol) is dissolved in dichloromethane (30 ml) and triethylamine (0.5 g, 5 mmol) is added. After 48 h, the solution is washed with 0.2 M HCl, dried (Na$_2$SO$_4$) and evaporated in vacuo to a black tar. The tar is dissolved in dichloromethane (50 ml) and methanol (100 ml) added. The solution is stirred in an open beaker overnight allowing solvent to slowly evaporate. The residual mother liquor (ca 20 ml) is decanted off and the residue is rinsed with methanol and dried under high vacuum to afford the title compound as a black gum (0.8 g, 84%); $\lambda_{max}$ (EtOAc) 636 nm (35,750), half bandwidth 162 nm.

Example 2

Preparation of Positive Black Polymer Particles

Black dye of example 1 (0.31 g), methyl methacrylate (2.7 ml) and dimethylaminoethyl methacrylate (2.7 ml) are added to a 250 ml round bottom flask and stirred to dissolve the dye. PDMS-MA mw 10000 (1.7 g) and dodecane (42.0 g) are added the flask and stirred at 300 rpm until homogenised. The flask is stirred under nitrogen, and heated to 85° C. V-59 is added. The reaction is stirred for 4 hours before being allowed to cool to room temperature. The dispersion is filtered through 50 micron cloth, then washed with dodecane and redispersed using a centrifuge (3×10000 rpm). Particles are viewed using SEM, average particle size is 320 nm.

Example 3

Formulation of Example 2

The electrophoretic ink is prepared by vortex mixing 0.099 g of particles comprising black dye of example 1, 0.0601 g of AOT (3 wt % solution in dodecane) and 1.8403 g of dodecane. The dispersion is then roller mixed for 30 minutes.

Two drops of this dispersion is then added to 1 ml of dodecane and roller mixed for 30 minutes. The zetapotential of the diluted sample is then measured using a Malvern NanoZS particle analyser.

zP: +204 mV

The colour coordinates of the dispersion are measured using an X-rite Color i5 spectrophotometer in a 50 micron Merck test cell.

| L* | a* | b* | X | Y | Z | x | y |
|---|---|---|---|---|---|---|---|
| 69.92 | −2.59 | 1.07 | 37.723 | 40.634 | 42.667 | 0.3117 | 0.3358 |

The invention claimed is:

1. Coloured polymer particles for use in electrophoretic devices comprising monomer units of at least one polymerisable dye and at least one co-monomer, wherein the at least one polymerisable dye is selected of Formula (3):

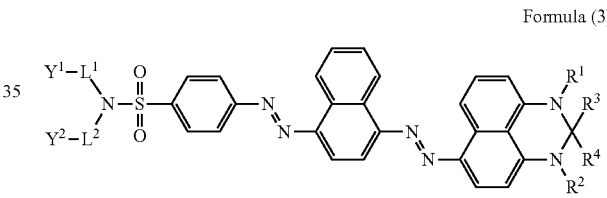

Formula (3)

wherein
R$^1$ and R$^2$ are independently of each other linear or branched, substituted or unsubstituted alkyl, where one or more non-adjacent carbon atoms may be replaced by O, S and/or N, substituted or unsubstituted cycloalkyl, substituted or unsubstituted aryl;
R$^3$ and R$^4$ are independently of each other H or linear or branched, substituted or unsubstituted alkyl, substituted or unsubstituted cycloalkyl, substituted or unsubstituted aryl, or R$^3$ and R$^4$ forming a cycloaliphatic ring;
L$^1$ and L$^2$ are independently of one another linear or branched, substituted or unsubstituted alkylene groups where one or more non-adjacent carbon atoms may be replaced by O, S and/or N;
Y$^1$ and Y$^2$ are independently of one another linear or branched alkyl groups or polymerisable groups;
and wherein at least one of Y$^1$ and Y$^2$ is a polymerisable group.

2. The coloured polymer particles according to claim 1, wherein the at least one co-monomer comprises at least one amino group.

3. The coloured polymer particles according to claim 1, wherein the at least one co-monomer is selected from the group consisting of 2-Aminoethyl methacrylate hydrochloride, 2-(tert-Butylamino)ethyl methacrylate, 2-(Diethylamino)ethyl methacrylate, 2-(Dimethylamino)ethyl methacrylate, [2-methacryloxyethyl] trimethyl ammonium chloride, [3-(Methacryloylamino)propyl]trimethylammonium chloride, and [2-(Methacryloyloxy)ethyl]trimethylammonium methyl sulfate.

4. The coloured polymer particles according to claim 1, wherein said $Y^1$ and $Y^2$ are unsaturated alkyl groups comprising acrylate and methacrylate groups.

5. The coloured polymer particles according to claim 1, wherein $R^1$ and $R^2$ are independently of each other aryl or C1-C15 alkyl.

6. The coloured polymer particles according to claim 1, wherein $R^3$ and $R^4$ are independently of each other aryl or C1-C20 alkyl.

7. The coloured polymer particles according to claim 1, wherein at least one black polymerisable dye is used.

8. The coloured polymer particles according to claim 1, wherein the polymer particles have a diameter of 100-1000 nm.

9. A process for the preparation of the coloured polymer particles according to claim 1 comprising
   a) polymerizing at least one polymerisable dye, at least one co-monomer, and at least one initiator, by dispersion polymerisation in at least one non-aqueous, non-polar solvent, and optionally
   b) washing and drying the polymer particles wherein the at least one polymerisable dye of Formula (1) is used

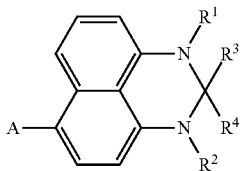

Formula (1)

wherein
A is a chromophoric residue comprising at least one polymerisable group;

$R^1$ and $R^2$ are independently of each other linear or branched, substituted or unsubstituted alkyl, where one or more non-adjacent carbon atoms may be replaced by O, S and/or N, substituted or unsubstituted cycloalkyl, substituted or unsubstituted aryl;

$R^3$ and $R^4$ are independently of each other H or linear or branched, substituted or unsubstituted alkyl, substituted or unsubstituted cycloalkyl, substituted or unsubstituted aryl, or $R^3$ and $R^4$ forming a cycloaliphatic ring.

10. An electrophoretic fluid comprising polymer particles prepared by the process according to claim 9.

11. A device comprising the polymer particles according to claim 1, wherein the device is an optical, electrooptical, electronic, electrochemical, electrophotographic, electrowetting and electrophoretic displays, and in security, cosmetic, decorative, and diagnostic applications.

12. The device as claimed in claim 11, wherein the device is in mono, bi or polychromal electrophoretic device.

13. An electrophoretic fluid comprising the polymer particles according to claim 1.

14. An electrophoretic display device comprising an electrophoretic fluid according to claim 13.

15. The electrophoretic display device according to claim 14, wherein the electrophoretic fluid is applied by a technique selected from the group consisting of inkjet printing, slot die spraying, nozzle spraying, and flexographic printing.

16. The coloured polymer particles according to claim 1, wherein the polymerisable dyes comprise two polymerisable groups selected from the group consisting of methacrylates, acrylates, methacrylamides, acrylamides, acrylonitriles, α-substituted acrylates, styrenes and vinyl ethers, vinyl esters, propenyl ethers, oxetanes and epoxys.

17. The coloured polymer particles according to claim 1, wherein the polymerisable dyes comprise two polymerisable groups selected from the group consisting of methacrylates and acrylates.

18. The coloured polymer particles according to claim 1, wherein the polymerisable dyes are selected from the group consisting of

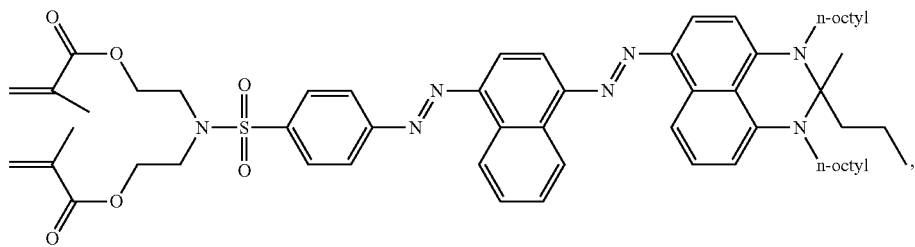

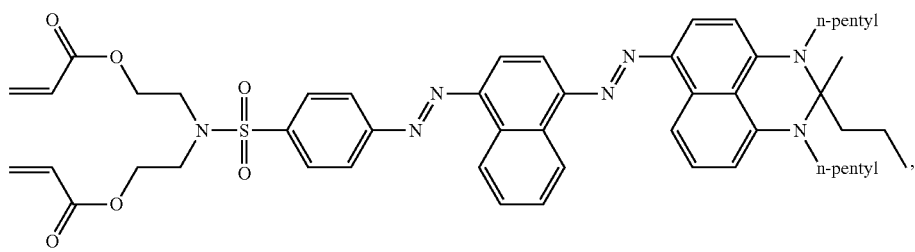

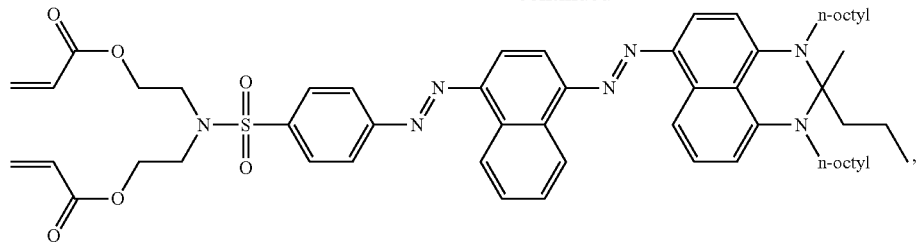
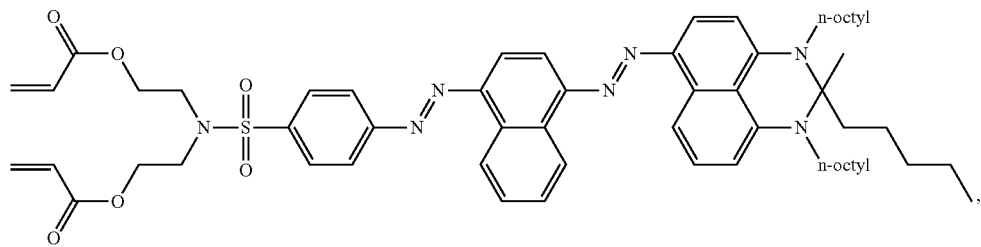
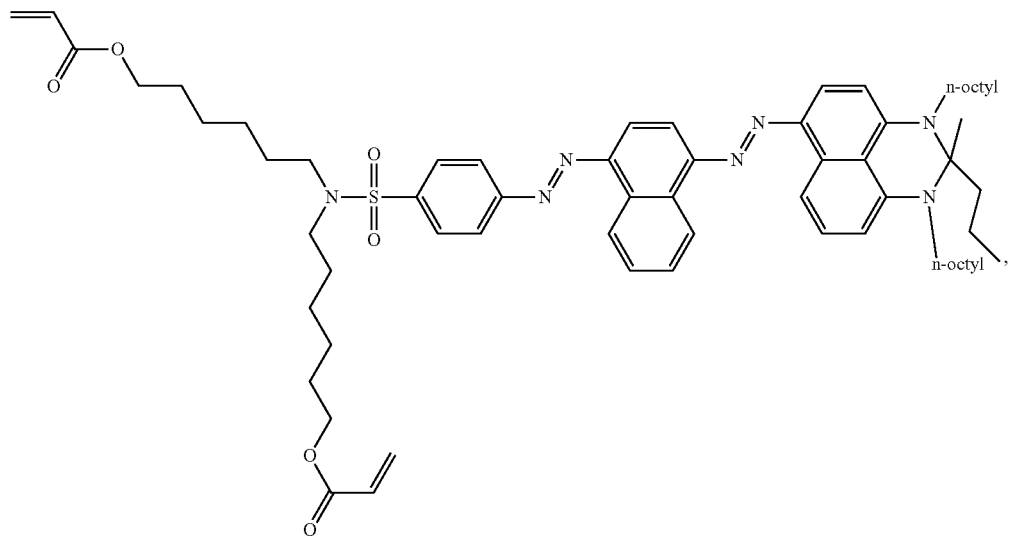
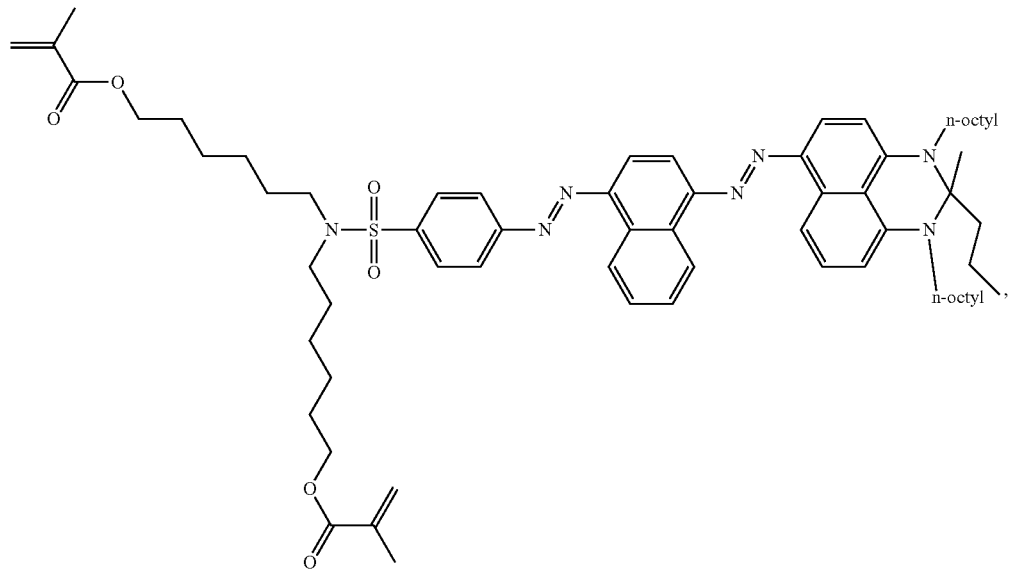

-continued
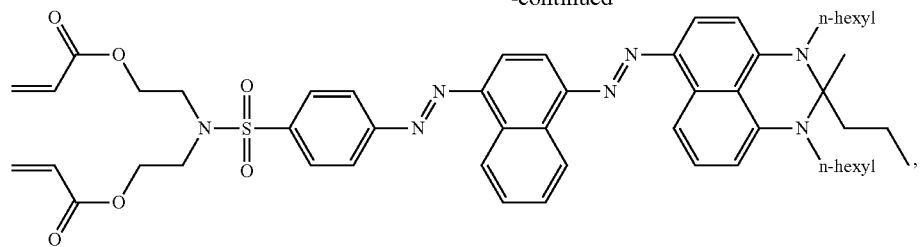
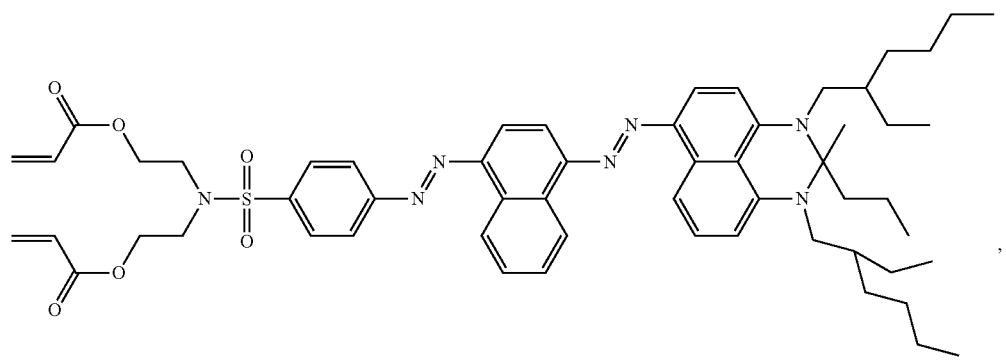
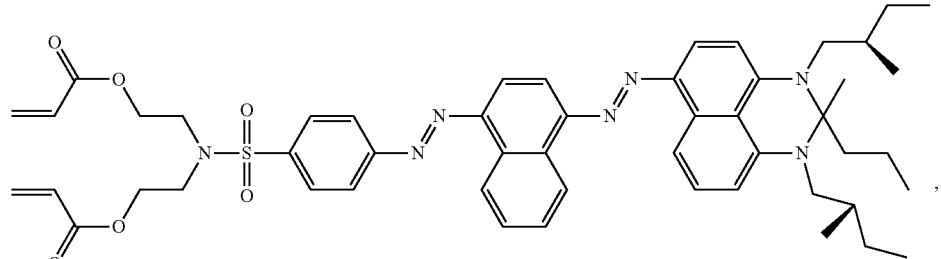
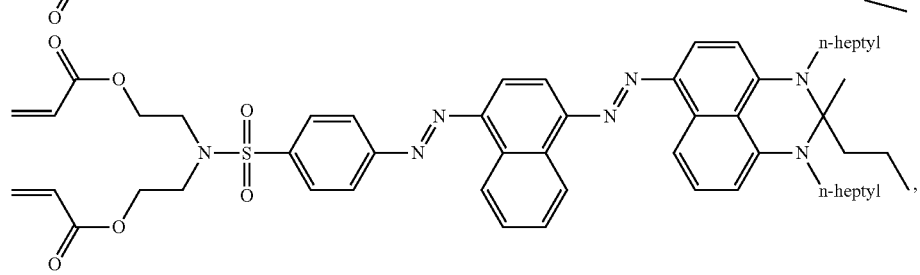
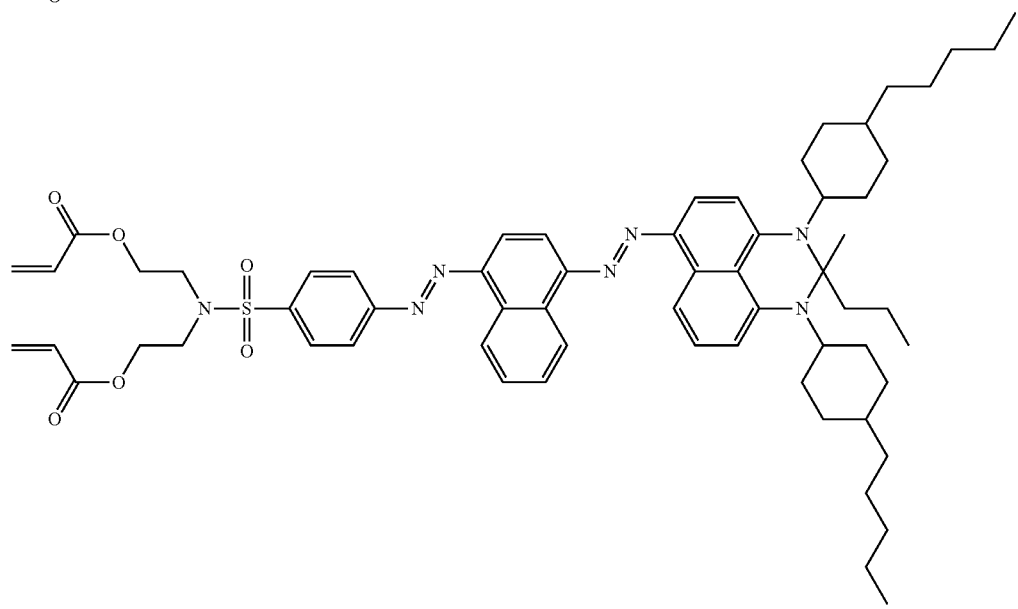
and

-continued

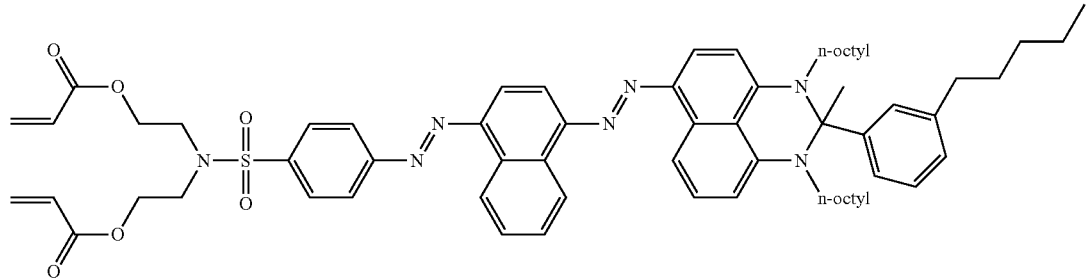

19. The coloured polymer particles according to claim 1, wherein

R¹ and R² are independently of each other aryl or C2-C12 alkyl and

R³ and R⁴ are independently of each other aryl or C1-C15 alkyl.

20. The coloured polymer particles according to claim 1, which comprises 0.1-15% by weight of the at least one polymerisable dye according to formula (3), 50-95%, by weight of the at least co-monomer and 1-40%, by weight of the at least one co-monomer comprising amino groups all percentages are based on the total weight of the polymerizable.

21. The coloured polymer particles according to claim 1, which comprises 1-10% by weight of the at least one polymerizable dye according to formula (3), 70-90% by weight of the at least one co-monomer, 1-10% by weight of the at least one co-monomer comprising amino groups, and 0.1-5% by weight of initiator, all percentages are based on the total weight of the polymerizable composition.

* * * * *